(12) United States Patent
Skweres et al.

(10) Patent No.: US 9,555,790 B2
(45) Date of Patent: Jan. 31, 2017

(54) SERVICE MAIN PISTON BUSHING CONTAINING TWO SPRING RAMPS

(71) Applicant: WABTEC HOLDING CORP., Wilmerding, PA (US)

(72) Inventors: Jeffrey B. Skweres, McKeesport, PA (US); Michael S. Plechey, Jeannette, PA (US); Gary M. Sich, Irwin, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 78 days.

(21) Appl. No.: 14/402,317

(22) PCT Filed: May 24, 2013

(86) PCT No.: PCT/US2013/042593
§ 371 (c)(1),
(2) Date: Nov. 20, 2014

(87) PCT Pub. No.: WO2013/177489
PCT Pub. Date: Nov. 28, 2013

(65) Prior Publication Data
US 2015/0144825 A1 May 28, 2015

Related U.S. Application Data

(60) Provisional application No. 61/651,272, filed on May 24, 2012.

(51) Int. Cl.
*F16K 11/065* (2006.01)
*B60T 15/02* (2006.01)
*B60T 15/42* (2006.01)

(52) U.S. Cl.
CPC .............. *B60T 15/021* (2013.01); *B60T 15/42* (2013.01)

(58) Field of Classification Search
CPC .............................. B60T 15/021; B60T 15/42
USPC ....... 303/33, 35, 38, 41; 137/625.22, 625.23, 137/625.24, 625.25, 625.67
See application file for complete search history.

(56) References Cited

U.S. PATENT DOCUMENTS

| | | | |
|---|---|---|---|
| 418,506 A * | 12/1889 | Dixon | B60T 15/048 303/41 |
| 1,929,546 A | 10/1933 | Campbell | |
| 1,929,575 A * | 10/1933 | Campbell | B60T 15/46 303/35 |
| 2,804,354 A | 8/1957 | Cook | |

(Continued)

FOREIGN PATENT DOCUMENTS

| | | |
|---|---|---|
| CN | 1035800 A | 9/1989 |
| WO | 2012040701 A2 | 3/2012 |
| WO | 2013169891 A1 | 11/2013 |

*Primary Examiner* — Umashankar Venkatesan
(74) *Attorney, Agent, or Firm* — The Webb Law Firm (57) ABSTRACT

A main piston bushing for a service valve portion of a brake control valve includes a cylindrical sidewall defining a central passageway extending longitudinally through the main piston bushing, the central passageway being surrounded by an internal surface of the cylindrical sidewall. The central passageway is configured to receive the main piston assembly of the service valve portion. The internal surface of the cylindrical sidewall includes a first ramp and a second ramp defined therein, the first ramp and the second ramp being configured to engage a portion of the main piston assembly of the service valve portion to restrain movement of the main piston assembly.

43 Claims, 9 Drawing Sheets

(56) References Cited

U.S. PATENT DOCUMENTS

| | | |
|---|---|---|
| 4,744,609 A | 5/1988 | Weber, Jr. |
| 4,770,472 A | 9/1988 | Weber, Jr. et al. |
| 4,798,420 A | 1/1989 | Rojecki |
| 4,974,910 A | 12/1990 | Hart |
| 5,044,698 A | 9/1991 | Hart et al. |
| 5,213,397 A | 5/1993 | Troiani |
| 5,450,782 A | 9/1995 | Hart et al. |
| 7,654,584 B2 | 2/2010 | Blivet et al. |
| 2013/0248031 A1 | 9/2013 | Sich et al. |
| 2016/0068148 A1* | 3/2016 | Connell .................. B60T 15/42 303/30 |

* cited by examiner

SERVICE MAIN PISTON BUSHING CONTAINING TWO SPRING RAMPS

CROSS REFERENCE TO RELATED APPLICATION

This application is the United States national phase of International Application No. PCT/US2013/042593 filed May 24, 2013, and claims priority to U.S. Provisional Patent Application No. 61/651,272, filed on May 24, 2012, the disclosures of which are hereby incorporated in their entirety by reference.

BACKGROUND OF THE INVENTION

Field of the Invention

The present invention generally relates to a brake apparatus for railway vehicles and, more particularly, to a main piston bushing of a service portion of a brake control valve.

Description of Related Art

China Railways have a standardized pneumatic air brake valve, called 120-1 type, which is similar in overall operation to American Association of Railroads (AAR) pneumatic air brake valves (such as the WABCO ABDX), with a pipe bracket, service valve portion, and emergency valve portion.

The service valve portion of such valves typically includes a body with a central opening that houses a main piston assembly that is housed within the central opening. A main piston bushing is positioned within the central opening of the body of the service valve portion between the central opening and the main piston assembly. The main piston assembly includes a service slide valve and a service graduating valve that is assembled on the service piston. The service slide valve, the service graduating valve, and the main bushing each includes a number of openings and passages extending therethrough that define porting patterns. The service slide valve and the service graduating valve are movable with respect to the piston passageway of the body of the service valve portion, with respect to the main bushing, and with respect to each other. Accordingly, various flow passageways are opened through the service valve portion depending upon the relative position of the service slide valve, the service graduating valve, and the main bushing with respect to each other, and the alignment of the various openings and recesses that define the porting patterns of the service slide valve, the service graduating valve, and the main bushing. The service valve portion will perform various brake valve functions, which involve the flow of pressurized air between various locations within the brake line system, depending upon the relative positioning and alignment. This type of system brake valve control is well known to those having ordinary skill in the art and is utilized in the Chinese 120-1 type valves and in the ABDX and ABDW-type brake control valves, which are manufactured by the WABTEC Corporation.

In the ABDX-type brake control valve, the main piston bushing contains a single spring ramp machined into an interior surface of the bushing. The specific purpose of the spring ramp is to provide a slight delay of the main piston assembly to provide a more aggressive preliminary quick service function. This is done by one end of the main piston assembly's wing spring, which must climb out of the spring ramp in the main bushing, before the service slide valve moves out of its release position.

However, when the main piston assembly moves the service slide valve from its release position to its service position, the only mechanism that stops the service slide valve in this position is a combination of the friction between the service slide valve face and its seat, as well as the rate at which the pressure differential between the auxiliary reservoir and the brake pipe is dissipated across the diaphragm-actuated main piston assembly. Depending upon the specific configuration of the brake valve system, it is critical that the service slide valve be stopped in its service position on a consistent basis. If it does not, the service slide valve could travel further to either its boost position or possible jump position on the initial brake application, depending upon the amount of pressure differential and friction acting upon the main piston assembly.

SUMMARY OF THE INVENTION

Accordingly, there is a general need in the art for a brake control valve that incorporates a main piston bushing containing a mechanism for providing a secondary delay for retaining the service slide valve in the service position and preventing premature movement of the service slide valve from the service position to either the boost position or the jump position.

According to one embodiment, a main bushing in a service valve portion of a brake control valve includes two spring ramps. The first spring ramp being provided to act as a delay by engaging the wing spring of a main piston assembly to retain the service slide valve in the release position until a sufficient pressure differential across the main piston assembly is achieved. The second spring ramp being provided to act as a secondary delay by engaging the wing spring of the main piston assembly to retain the service slide valve in the service position and prevent premature movement of the service slide valve to the boost position and/or possible jump position.

According to one embodiment, the second spring ramp is provided to help stop the service slide valve in its service position and make the required port connections between the service slide valve and the main bushing during all brake pipe reductions, except for over-reductions and emergency applications.

According to one embodiment, the second spring ramp is positioned in the bushing to ensure that the top end of the wing spring climbs down into the second spring ramp when the service slide valve reaches its service position. In order for the service slide valve to move further on its seat, an increased differential across the diaphragm-actuated main piston will be required before the top end of the wing spring is able to climb out of the second spring ramp, thus allowing the main piston to move the service slide valve from its service position to its boost position on its seat.

According to one embodiment, the second spring ramp in the main bushing provides an increased friction mechanism in the main piston assembly to stop the service slide valve in its service position during initial brake applications. Therefore, additional main piston force will be required across the main piston assembly before the slide valve can move from its service position to its boost position. Also, additional main piston force will be required for the service slide valve to reach its jump position, if the sliding friction between the service slide valve and its seat becomes less than the longitudinal tail spring load acting upon the service slide valve. The second spring ramp will reduce the risk of the service slide valve assembly from reaching its jump position on its seat, if abnormally low sliding frictional characteristics are present.

During testing of certain service valve portions, testing failures have been noted due to the service slide valve having over traveled and, thus, finding the jump position on its seat. Notably, this occurs when too much lubricant is used on the entire main piston assembly, thus significantly decreasing the sliding friction of the service slide valve on its seat. Adding the second spring ramp makes the design more robust to variations in the amount of lubricant applied to the entire main piston assembly during initial assembly of the service valve portion.

According to one particular embodiment of the present disclosure, a main piston bushing for a service valve portion of a brake control valve is provided. The main piston bushing includes a cylindrical sidewall defining a central passageway extending longitudinally through the main piston bushing, the central passageway being surrounded by an internal surface of the cylindrical sidewall. The central passageway is configured to receive the main piston assembly of the service valve portion. The internal surface of the cylindrical sidewall includes a first ramp and a second ramp defined therein, the first ramp and the second ramp being configured to engage a portion of the main piston assembly of the service valve portion to restrain movement of the main piston assembly.

According to another particular embodiment of the present disclosure, a service valve portion of a brake control valve is provided. The service valve portion includes a body having a first side, a second side, and a piston passageway defined therein extending from the top side to the bottom side; a main bushing disposed within the piston passageway of the body, the main bushing including a cylindrical sidewall defining a central passageway extending longitudinally through the main piston bushing, the central passageway being surrounded by an internal surface of the cylindrical sidewall; and a main piston assembly movably disposed within the central passageway of the main bushing inside the piston passageway. The internal surface of the cylindrical sidewall includes a first ramp and a second ramp defined therein, the first ramp and the second ramp being configured to engage a portion of the main piston assembly to restrain movement of the main piston assembly.

Further details and advantages of the various embodiments of the invention detailed herein will become clear upon reviewing the following detailed description of the preferred embodiments in conjunction with the accompanying drawing figures.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
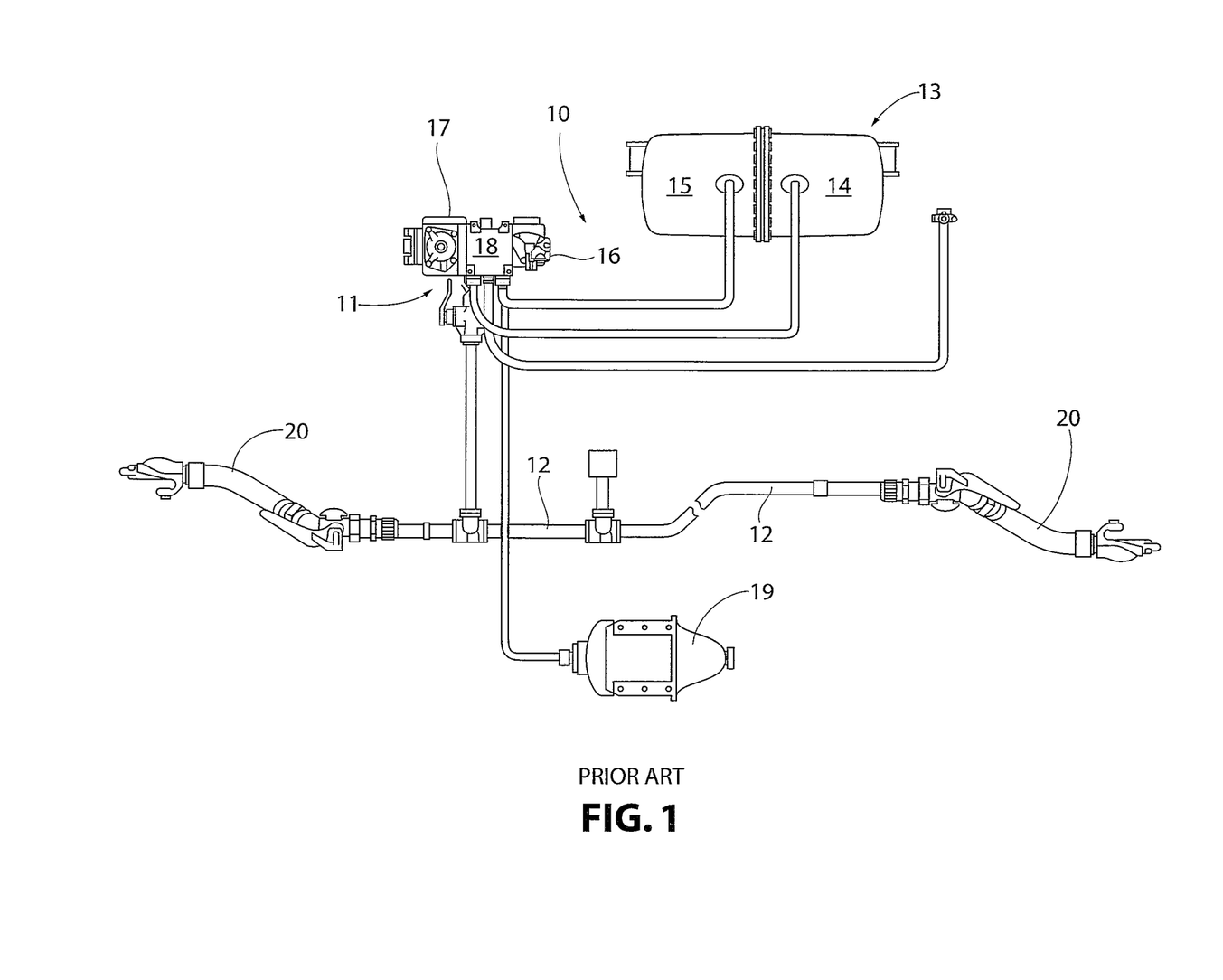
FIG. 1 is a schematic of a prior art brake control system for a freight car using an ABDX brake control valve.

FIG. 1 illustrates a typical prior art type brake system 10 for a single railway freight car in which a brake control valve 11 is shown pneumatically interconnected between a brake pipe 12 of the car and a dual compartment reservoir 13 of compressed air located on the car. As is clearly shown, the dual compartment reservoir 13 is comprised of two individual compartment reservoirs, one is an auxiliary reservoir 14 and the other is an emergency reservoir 15. The auxiliary reservoir 14 and emergency reservoir 15 are joined together as the single dual compartment reservoir unit 13. The brake control valve 11 has both a service valve portion 17 and an emergency valve portion 16 mounted respectively on opposed sides of a pipe bracket 18 in a well-known manner and pneumatically connected to the appropriate respective sides of the dual compartment reservoir 13, also in a well-known manner. The dual compartment reservoir 13 and pipe bracket 18 are connected to supply air pressure to brake cylinders 19 located on the railway cars, only while flexible hose couplers 20 are connected to opposed ends of the brake pipe 12 and are employed to serially connect such brake pipes 12 to the brake pipes of adjacently disposed cars that will be mechanically connected to the brake pipe 12 disposed on the car under discussion. This brake system is exemplified by ABDX and ABDW-type brake control valves, which are manufactured by the WABTEC Corporation and are well known in the railway brake control art in the North American market.

Figure 2:
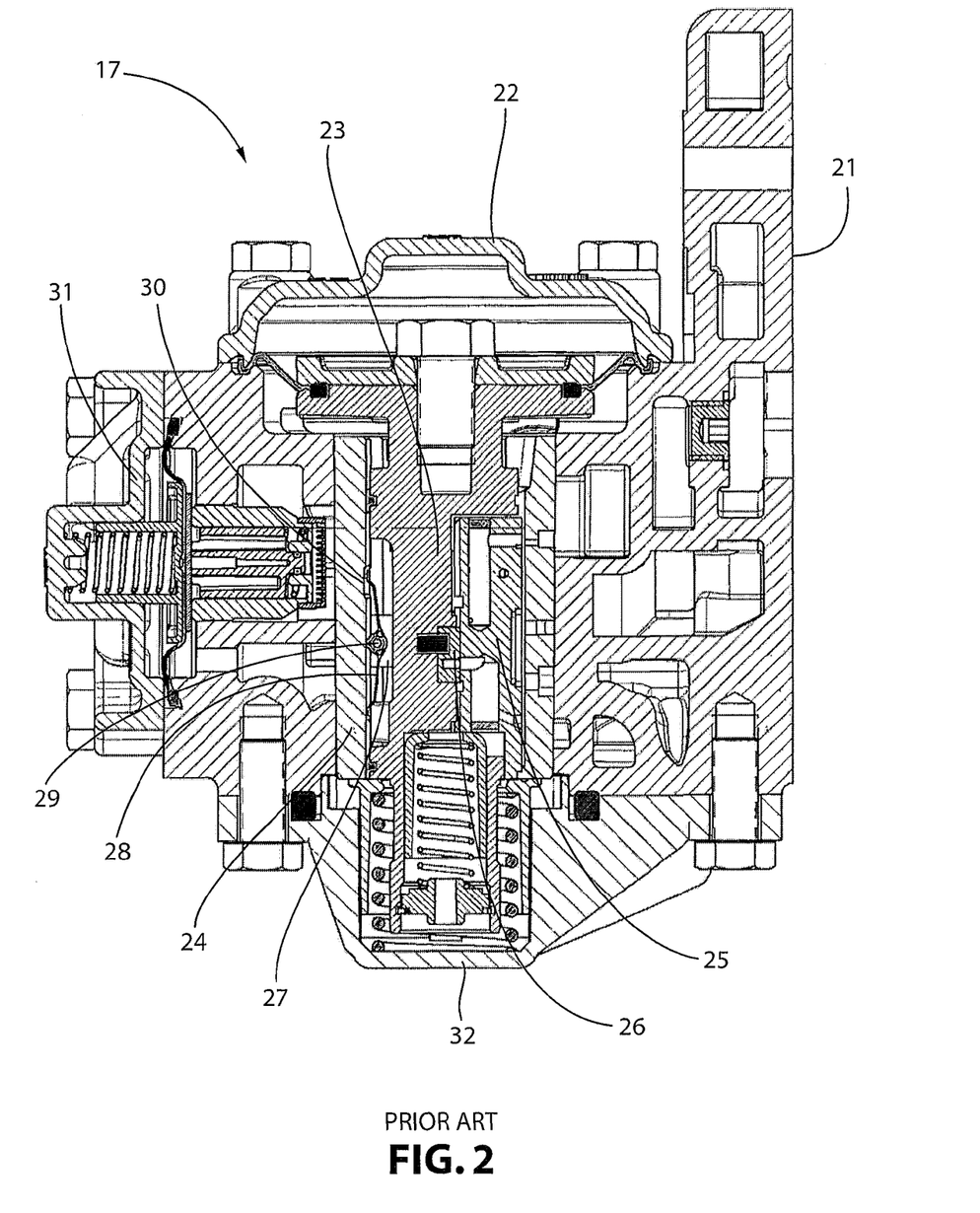
FIG. 2 is a cross-sectional view of a prior art service valve portion.
Figure 3:
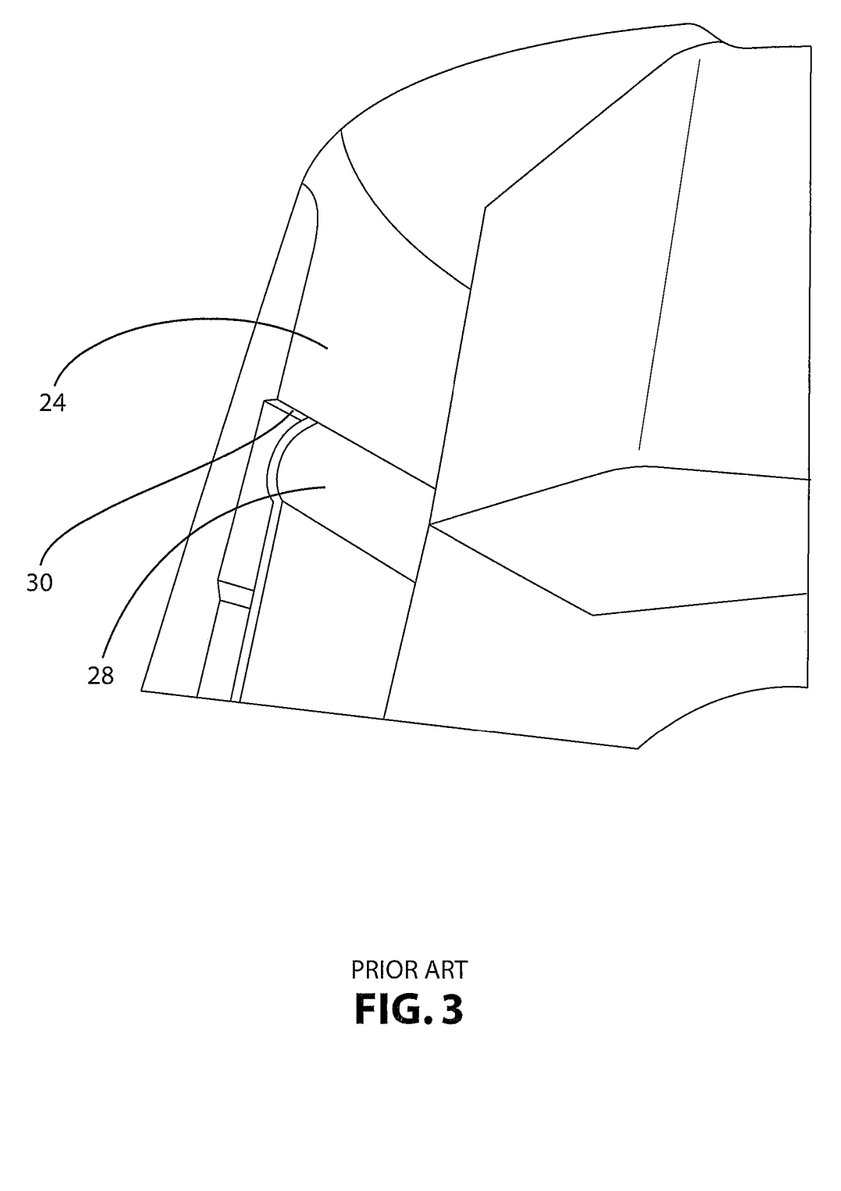
FIG. 3 is a partial cut away view of the prior art service valve portion of FIG. 2.
Figure 4:
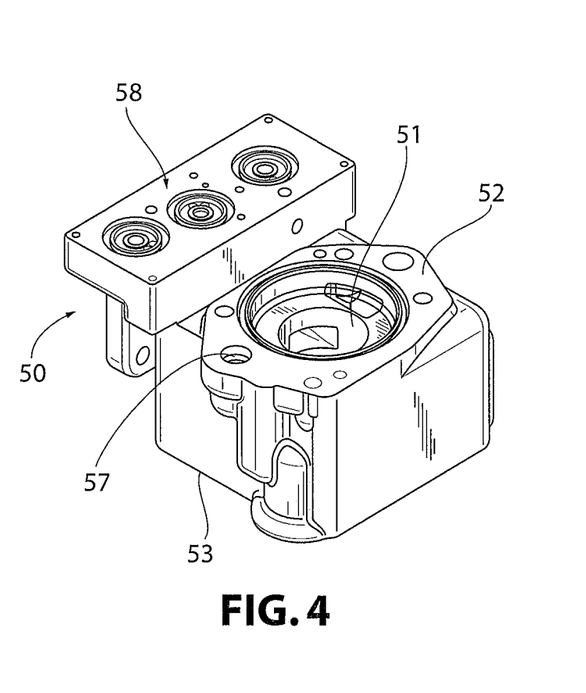
FIG. 4 is a front top isometric view of a service portion body for a brake control valve according to one embodiment.
Figure 5:
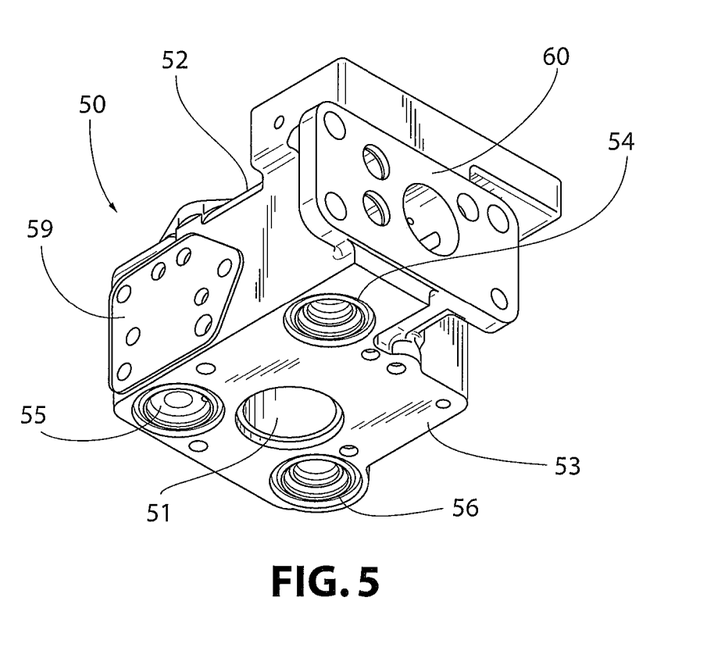
FIG. 5 is a rear bottom isometric view of the service portion body shown in FIG. 4.
Figure 6:
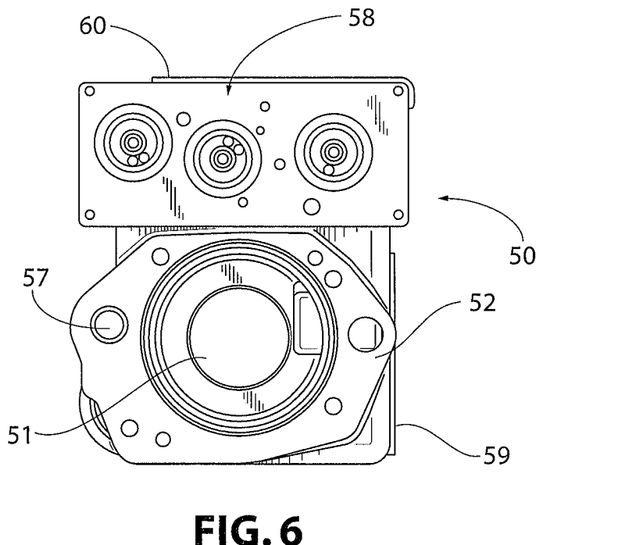
FIG. 6 is a top view of the service portion body shown in FIG. 4.
Figure 7:
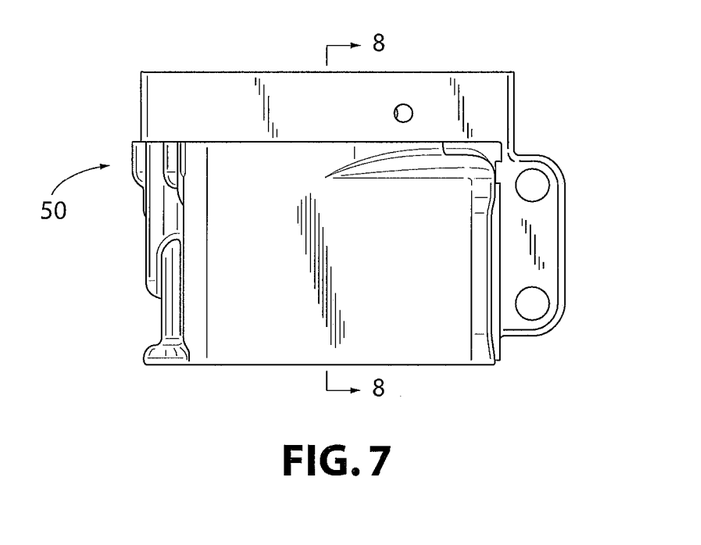
FIG. 7 is a front view of the service portion body shown in FIG. 4.
Figure 8:
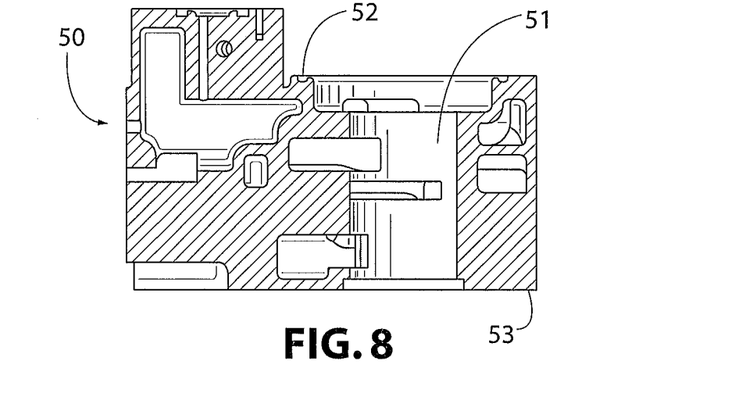
FIG. 8 is a cross-sectional view of the service portion body shown in FIG. 4 taken along line 8-8 in FIG. 7.
Figure 9:
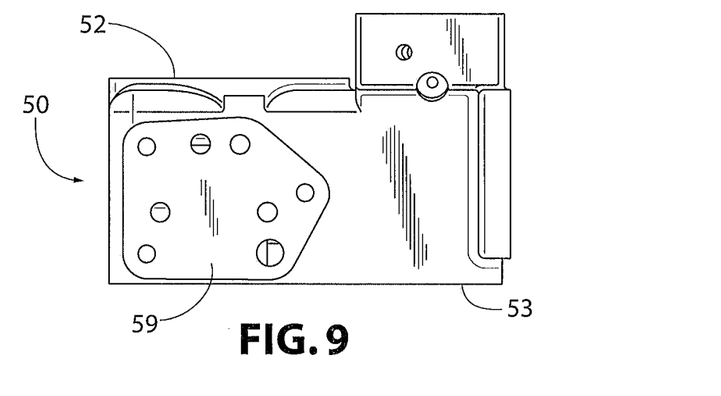
FIG. 9 is a side view of the service portion body shown in FIG. 4.
Figure 10:
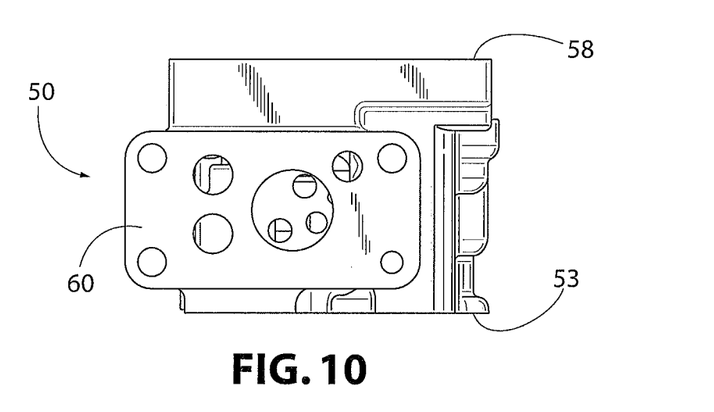
FIG. 10 is a rear view of the service portion body shown in FIG. 4.
Figure 11:
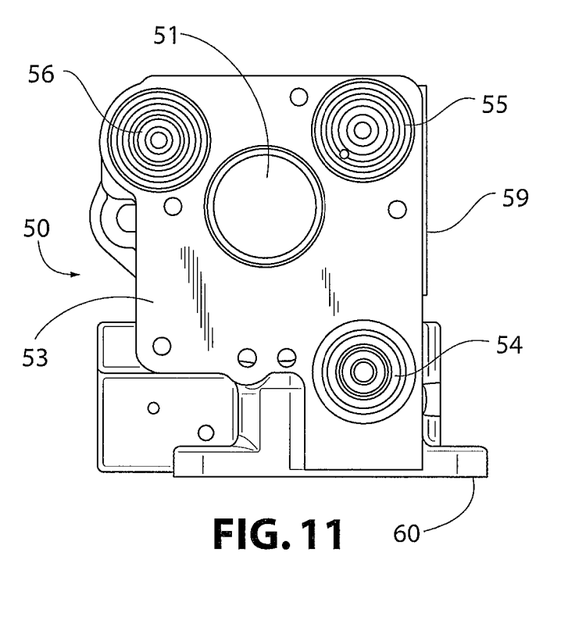
FIG. 11 is a bottom view of the service portion body shown in FIG. 4.
Figure 12:
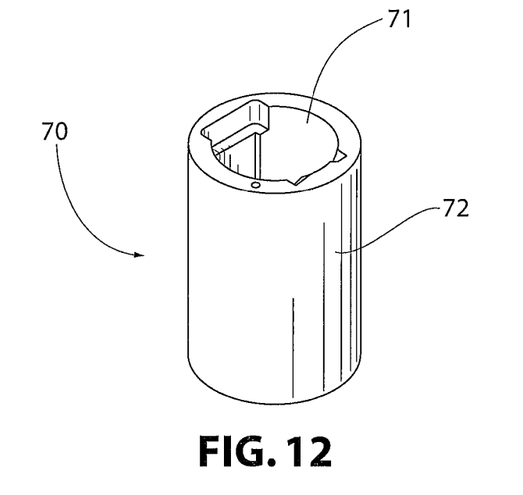
FIG. 12 is an isometric view of a main bushing according to one embodiment.

FIGS. 2 and 3 illustrate cross-sectional and partial cut away views of a prior art service valve portion 17 that may be used in the brake system 10 illustrated in FIG. 1. The service valve portion 17 includes a body 21 having a central piston passageway, which houses a main bushing 24. The main bushing 24 internally receives a main piston assembly that includes a service piston 23, a service slide valve 25, a service graduating valve 26, and a wing spring 28. The wing spring 28 is connected to extensions 27 of the service slide valve 25 by a roll pin 29. The extensions 27 of the service slide valve 25 extend across the central piston passageway on either side of the service piston 23 to house the wing spring 28. The wing spring 28 holds the service slide valve 25 in a vertical position on its seat in the main bushing 24 to prevent port-to-port leakage between the service slide valve 25, the service graduating valve 26, and the main bushing 24.

As discussed above, the service slide valve 25, the service graduating valve 26, and the main bushing 24 each includes a number of openings and passages extending therethrough that define porting patterns. The service slide valve 25 and the service graduating valve 26 are movable with respect to the piston passageway of the body 21 of the service valve portion 17, with respect to the main bushing 24, and with respect to each other. Accordingly, various flow passageways are opened through the service valve portion 17 depending upon the relative position of the service slide valve 25, the service graduating valve 26, and the main bushing 24 with respect to each other and the alignment of the various openings and recesses that define the porting patterns of the service slide valve 25, the service graduating valve 26, and the main bushing 24. The service valve portion 17 will perform various brake valve functions, which involve the flow of pressurized air between various locations within the brake line system, depending upon this relative positioning and alignment.

In particular, the service slide valve 25 is moved through its various positions within the main bushing 24 and the central piston passageway by the service piston 23, which is diaphragm-actuated. A pressure differential between the brake pipe 12 and the auxiliary reservoir 14 must be developed within the body 21 of the service valve portion 17 and across the service piston 23 to move the service piston 23, which, in turn, moves the service slide valve 25 through its various positions on the slide valve seat in the main bushing 24.

A single spring ramp 30 is machined into the interior surface of the main bushing 24 to engage one end of the wing spring 28 and to provide a slight delay of the main piston assembly in order to achieve a more aggressive preliminary quick service function. As shown in FIG. 3, when the service slide valve moves from the release position, the trailing surface of the ramp 30 engages the top end of the wing spring 28, which must climb out of the spring ramp 30 in the main bushing 24 before the service slide valve is able to move out of the release position. Accordingly, a specific designed differential within the service valve portion 17 and across the main piston assembly is required before the top end of the wing spring 28 is able to climb out of the spring ramp 30 and, thus, allow the service piston 23 to move the service slide valve 25 on its seat to the service position and subsequent positions. As shown in FIG. 2, the service valve portion 17 also includes a top cover 22 positioned over the central piston passageway, a side cover 31 positioned on an outer side of the body 21 of the service valve portion 17, and a bottom cover 32 positioned underneath the central piston passageway. These covers 22, 31, 32 house the various components making up the service valve portion 17.

Referring to FIGS. 4-11, one embodiment of a body 50 for a service portion of a brake control valve is shown. The body 50 generally defines a piston passageway 51 axially extending from a top 52 of the body 50 to a bottom 53 of the body 50. The body 50 also defines an inshot valve passageway 54, a limiting valve passageway 55, and a service accelerated release (SAR) valve passageway 56 that each extend from the bottom 53 of the body 50 in a direction toward the top 52 of the body 50. The body 50 also defines a back-flow check valve passageway 57 generally extending from the top 52 of the body 50 towards the bottom 53 of the body 50. The body 50 further includes ECP porting 58 configured to receive an ECP coin plate, a release valve receiving surface 59 configured to mount an ABDX release valve portion, and a pipe bracket receiving surface 60 configured to receive a Chinese type 120-1 pipe bracket. The piston passageway 51 receives a main piston assembly (not shown) made up of a service piston, a service graduating valve, and a service slide valve that are movable within a main bushing 70. The service graduating valve and the service slide valve are similar to the components discussed above with respect to FIG. 2. The main bushing 70 will be discussed in further detail below. The limiting valve passageway 55 receives a brake cylinder limiting valve assembly (not shown). The inshot valve passageway 54 and the SAR valve passageway 56 receive an inshot valve assembly (not shown) and an SAR valve assembly (not shown), respectively. The back-flow check valve passageway 57 receives a back-flow check valve assembly (not shown).

Figure 13:
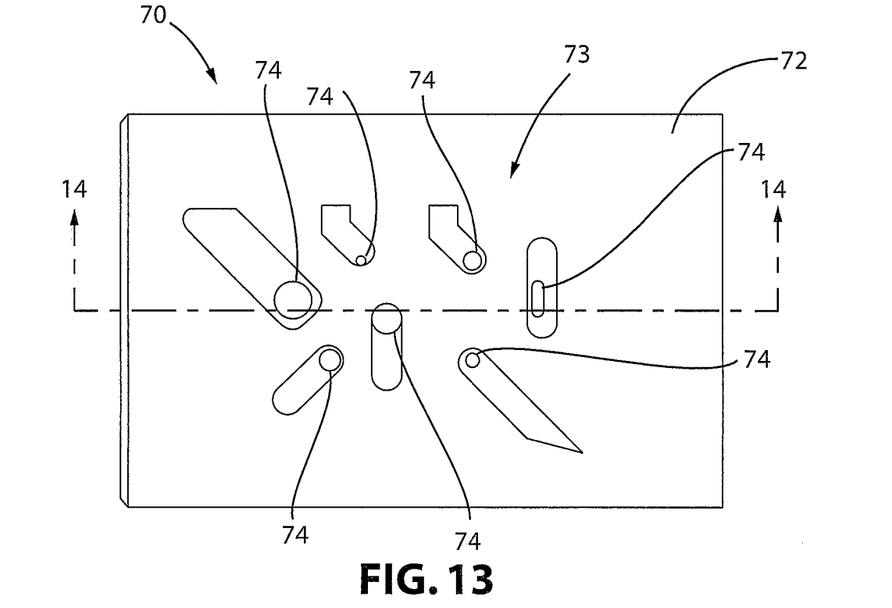
FIG. 13 is a side view of the main bushing shown in FIG. 12.

Referring to FIGS. 12-16, one embodiment of a main bushing 70 is disclosed. The main bushing 70 is received within the piston passageway 51 of the body 50 of the service portion and internally houses a main piston assembly that includes the combined service graduating valve and service slide valve. The main bushing 70 is generally cylindrical shaped having a cylindrical sidewall 72, which defines a central passageway 71 extending longitudinally through the main bushing 70 for receiving the main piston assembly. The cylindrical sidewall 72 includes a plurality of passages 74 extending therethrough that define a porting pattern 73, as shown in FIG. 13.

Figure 14:
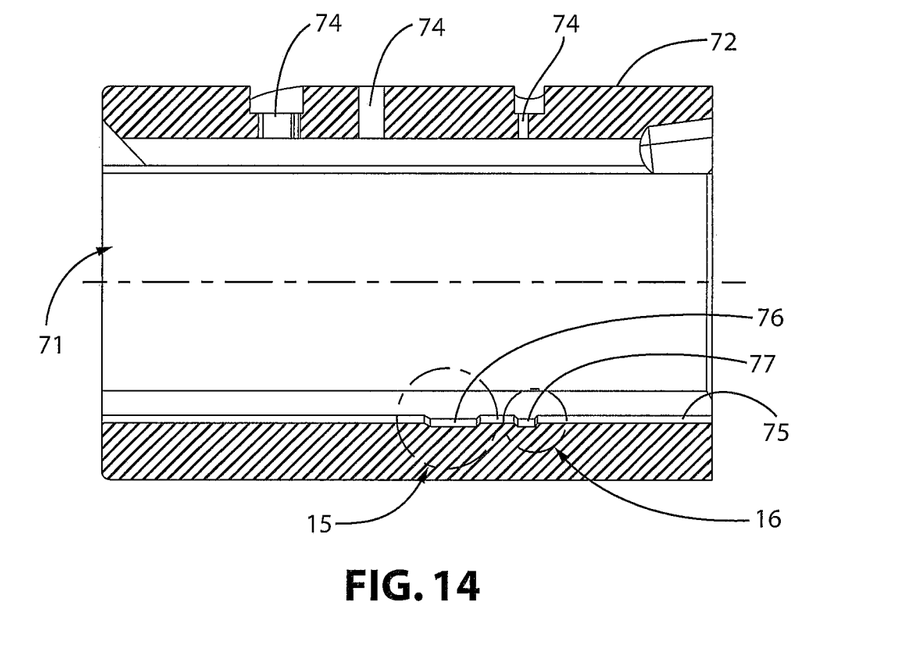
FIG. 14 is a cross-sectional view of the main bushing shown in FIG. 12 taken along line 14-14 in FIG. 13.
Figure 15:
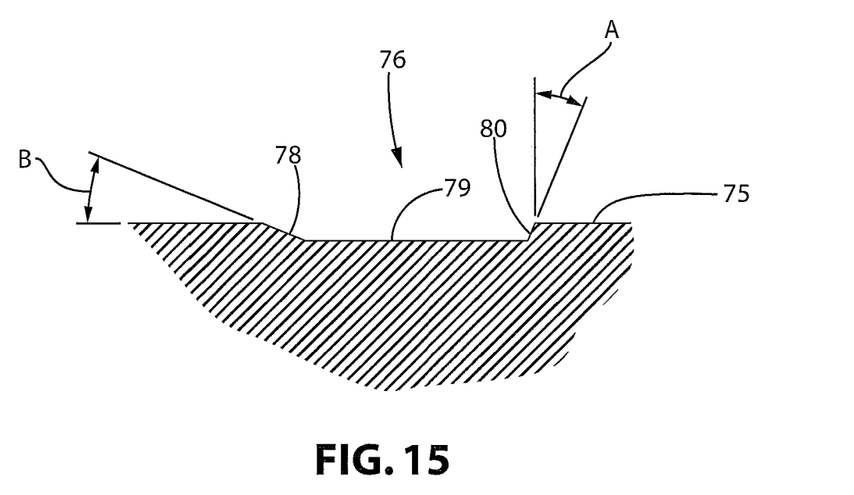
FIG. 15 is a detailed view of a first spring ramp of the main bushing shown in FIG. 12 taken from area 15 in FIG. 14.
Figure 16:
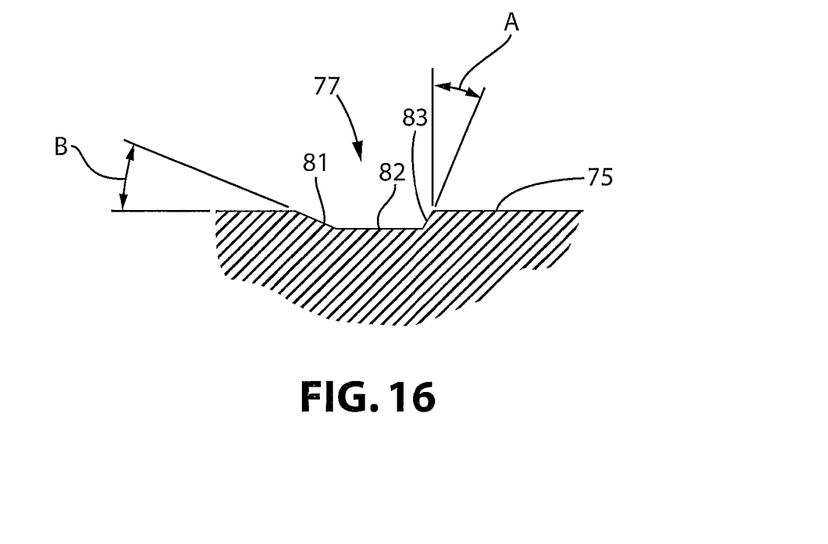
FIG. 16 is a detailed view of a second spring ramp of the main bushing shown in FIG. 12 taken from area 16 in FIG. 14.

As shown in FIGS. 14-16, an internal surface 75 of the cylindrical sidewall 72 of the main bushing 70 surrounding the central passageway 71 has a first ramp 76 and a second ramp 77 defined therein. The first ramp 76 and the second ramp 77 are positioned adjacent to each other at positions corresponding to the release position of the service slide valve and the service position of the service slide valve. As shown in FIG. 15, the first ramp 76, which corresponds to the ramp 30 discussed above with respect to the prior art service valve portion 17 shown in FIGS. 2 and 3, includes a leading surface 78, which extends at an angle B with respect to the internal surface 75 of the main bushing 70, a base surface 79, which extends parallel to the internal surface 75, and a trailing surface 80, which extends at an angle A with respect to a radial axis perpendicular to the internal surface 75. As shown in FIG. 16, the second ramp 77 includes a leading surface 81, which extends at the angle B with respect to the internal surface 75 of the main bushing 70, a base surface 82, which extends parallel to the internal surface 75, and a trailing surface 83, which extends at an angle A with respect to a radial axis perpendicular to the internal surface 75.

As discussed above, as the service piston moves from the release position, the top end of the wing spring moves in the first ramp 76 such that the trailing surface 80 of the first ramp 76 engages the top end of the wing spring, such that the top end of the wing spring must climb out of the first ramp 76 before the service slide valve is able to move out of the release position. Accordingly, a specific designed differential within the service valve portion across the main piston assembly is required before the top end of the wing spring is able to climb out of the first ramp 76 and, thus, allow the service piston to move the service slide valve on its seat to the service position and subsequent positions. The angle A of the trailing surface 80 of the first ramp 76 is set such that the trailing surface 80 is able to prevent movement of the wing spring until the desired pressure differential is achieved within the service valve portion. The angle B of the leading surface 78 is set to allow for unhindered movement of the bottom end of the wing spring out of the first ramp 76 during initial valve assembly. During operation of the service slide valve, the bottom end of the wing spring is not located inside the first ramp 76. Only during initial assembly does the bottom end of the wing spring climb up the leading surface 78.

When the main piston assembly moves the service slide valve to the service position, the top end of the wing spring moves out of the first ramp 76 and into the second ramp 77 such that the trailing surface 83 of the second ramp 77 engages the top end of the wing spring of the main piston assembly in order to stop the service slide valve in the service position and prevent movement of the service slide valve beyond the service position towards the boost position. Thus, the second ramp 77 retains the service slide valve in the service position to maintain the proper port connections required between the service slide valve and the main bushing 70 while in this specific position. The second ramp 77 also prevents the service slide valve from prematurely moving from the service position toward the boost position and further. In order for the service slide valve to move further on its seat, an increased differential across the diaphragm-actuated main piston will be required before the top end of the wing spring is able to climb out of the second ramp 77, thus allowing the main piston to move the service slide valve from its service position to its boost position on its seat.

The angle A of the trailing surface 83 of the second ramp 77 is set such that the trailing surface 83 is able to prevent movement of the wing spring until an increased pressure differential across the main piston assembly is achieved within the service valve portion. The angle B of the leading surface 81 is set to allow for a smooth and unhindered transition of the wing spring out of the second ramp 77 when the service piston and the service slide valve move from either the service position or the boost position back towards the release position.

According to a particular embodiment of the present disclosure, the angle A of the trailing surfaces 80, 83 of the respective ramps 76, 77 is between approximately 20° and 40° with respect to the radial axis perpendicular to the internal surface 75 of the main bushing 70, more particularly between approximately 25° and 35° with respect to the radial axis, and even more particularly the angle A is approximately 30° with respect to the radial axis. According to another particular embodiment of the present disclosure, the angle B of the leading surfaces 78, 81 of the respective ramps 76, 77 is between approximately 10° and 30° with respect to the internal surface 75, more particularly between approximately 15° and 25° with respect to the internal surface 75, and even more particularly the angle B is approximately 20° with respect to the internal surface 75.

It is to be appreciated that the angle A of the trailing surfaces 80, 83 may have any value suitable for preventing movement of the wing spring out of the first or second ramp 76, 77 until a desired pressure differential across the main piston assembly is achieved within the service valve portion to move the service piston and the service slide valve from the release position to the service position and from the service position to the boost position. Likewise, it is to be appreciated that the angle B of the leading surfaces 78, 81 may have any value suitable for allowing relatively unhindered movement of the wing spring out of the first or second spring ramp 76, 77 as the service piston and the service slide valve move from the service position to the release position. It is also to be appreciated that the angles A, B may be set differently for each of the first and second spring ramps 76, 77.

While embodiments of a service main piston bushing were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A main piston bushing for a service valve portion of a brake control valve, the main piston bushing comprising:
    a cylindrical sidewall defining a central passageway extending longitudinally through the main piston bushing, the central passageway being surrounded by an internal surface of the cylindrical sidewall,
    wherein the central passageway is configured to receive a main piston assembly of the service valve portion, and
    wherein the internal surface of the cylindrical sidewall includes a first ramp and a second ramp defined therein and each having a leading surface and a trailing surface, the first ramp and the second ramp being configured to engage a portion of the main piston assembly of the service valve portion to restrain movement of the main piston assembly,
    wherein the first ramp is located at a position corresponding to a release position of a service slide valve of the main piston assembly and the first ramp is configured to engage the portion of the main piston assembly to prevent movement of the service slide valve to a service position until a predetermined pressure differential across the main piston assembly is achieved,
    wherein the second ramp is located at a position corresponding to a service position of the service slide valve of the main piston assembly and the second ramp is configured to engage the portion of the main piston assembly to prevent movement of the service slide valve from the service position in a direction away from the release position until a predetermined pressure differential across the main piston assembly is achieved, and
    wherein the second ramp is also configured to allow movement of the service slide valve from the service position in a direction towards the release position.

2. The main piston bushing according to claim 1, wherein the main piston bushing is configured to be received within a piston passageway of the service valve portion.

3. The main piston bushing according to claim 1, wherein the cylindrical sidewall includes a plurality of passages extending therethrough from an exterior of the cylindrical sidewall to the central passageway, the plurality of passages defining a porting pattern of a slide valve seat in the main piston bushing.

4. The main piston bushing according to claim 1, wherein the first ramp and the second ramp are positioned adjacent to each other.

5. The main piston bushing according to claim 1, wherein the first ramp is configured to engage a top end of a wing spring of the main piston assembly.

6. The main piston bushing according to claim 1, wherein the first ramp includes the leading surface extending at a first angle with respect to the internal surface of the cylindrical sidewall, a base surface extending parallel to the cylindrical sidewall, and the trailing surface extending at a second angle with respect to a radial axis perpendicular to the internal surface of the cylindrical sidewall.

7. The main piston bushing according to claim 5, wherein the first ramp includes the leading surface extending at a first angle with respect to the internal surface of the cylindrical sidewall, a base surface extending parallel to the cylindrical sidewall, and the trailing surface extending at a second angle with respect to a radial axis perpendicular to the internal surface of the cylindrical sidewall, and
wherein the second angle of the trailing surface of the first ramp is configured to prevent movement of the wing spring out of the first ramp toward the service position until the predetermined pressure differential is achieved.

8. The main piston bushing according to claim 6, wherein the first angle is between approximately 10° and 30°.

9. The main piston bushing according to claim 6, wherein the first angle is between approximately 15° and 25°.

10. The main piston bushing according to claim 6, wherein the first angle is approximately 20°.

11. The main piston bushing according to claim 6, wherein the second angle is between approximately 20° and 40°.

12. The main piston bushing according to claim 6, wherein the second angle is between approximately 25° and 35°.

13. The main piston bushing according to claim 6, wherein the second angle is approximately 30°.

14. The main piston bushing according to claim 1, wherein the second ramp is configured to engage a top end of a wing spring of the main piston assembly.

15. The main piston bushing according to claim 1, wherein the second ramp includes the leading surface extending at a third angle with respect to the internal surface of the cylindrical sidewall, a base surface extending parallel to the cylindrical sidewall, and the trailing surface extending at a fourth angle with respect to a radial axis perpendicular to the internal surface of the cylindrical sidewall.

16. The main piston bushing according to claim 14, wherein the second ramp includes the leading surface extending at a third angle with respect to the internal surface of the cylindrical sidewall, a base surface extending parallel to the cylindrical sidewall, and the trailing surface extending at a fourth angle with respect to a radial axis perpendicular to the internal surface of the cylindrical sidewall, and
wherein the third angle of the leading surface of the second ramp is configured to allow the wing spring to move out of the second ramp as the service slide valve moves toward the release position and the fourth angle of the trailing surface of the second ramp is configured to prevent movement of the wing spring out of the second ramp and out of the service position until the predetermined pressure differential is achieved.

17. The main piston bushing according to claim 15, wherein the third angle is between approximately 10° and 30°.

18. The main piston bushing according to claim 15, wherein the third angle is between approximately 15° and 25°.

19. The main piston bushing according to claim 15, wherein the third angle is approximately 20°.

20. The main piston bushing according to claim 15, wherein the fourth angle is between approximately 20° and 40°.

21. The main piston bushing according to claim 15, wherein the fourth angle is between approximately 25° and 35°.

22. The main piston bushing according to claim 15, wherein the fourth angle is approximately 30°.

23. A service valve portion of a brake control valve, the service valve portion comprising:
a body having a first side, a second side, and a piston passageway defined therein extending from the first side to the second side;
a main bushing disposed within the piston passageway of the body, the main bushing including a cylindrical sidewall defining a central passageway extending longitudinally through the main bushing, the central passageway being surrounded by an internal surface of the cylindrical sidewall; and
a main piston assembly movably disposed within the central passageway of the main bushing inside the piston passageway,
wherein the internal surface of the cylindrical sidewall includes a first ramp and a second ramp defined therein and each having a leading surface and a trailing surface, the first ramp and the second ramp being configured to engage a portion of the main piston assembly to restrain movement of the main piston assembly,
wherein the first ramp is located at a position corresponding to a release position of a service slide valve of the main piston assembly and the first ramp is configured to engage the portion of the main piston assembly to prevent movement of the service slide valve to a service position until a predetermined pressure differential across the main piston assembly is achieved,
wherein the second ramp is located at a position corresponding to a service position of the service slide valve of the main piston assembly and the second ramp is configured to engage the portion of the main piston assembly to prevent movement of the service slide valve from the service position in a direction away from the release position until a predetermined pressure differential across the main piston assembly is achieved, and
wherein the second ramp is also configured to allow movement of the service slide valve from the service position in a direction towards the release position.

24. The service valve portion according to claim 23, wherein the cylindrical sidewall includes a plurality of passages extending therethrough from an exterior of the cylindrical sidewall to the central passageway, the plurality of passages defining a porting pattern of a slide valve seat in the main bushing.

25. The service valve portion according to claim 23, wherein the first ramp and the second ramp are positioned adjacent to each other.

26. The service valve portion according to claim 23, wherein the main piston assembly includes a wing spring connected to the service slide valve and the first ramp is configured to engage a top end of the wing spring.

27. The service valve portion according to claim 23, wherein the first ramp includes the leading surface extending at a first angle with respect to the internal surface of the cylindrical sidewall, a base surface extending parallel to the cylindrical sidewall, and the trailing surface extending at a second angle with respect to a radial axis perpendicular to the internal surface of the cylindrical sidewall.

28. The service valve portion according to claim 26, wherein the first ramp includes the leading surface extending at a first angle with respect to the internal surface of the cylindrical sidewall, a base surface extending parallel to the cylindrical sidewall, and the trailing surface extending at a second angle with respect to a radial axis perpendicular to the internal surface of the cylindrical sidewall, and
 wherein the second angle of the trailing surface of the first ramp is configured to prevent movement of the wing spring out of the first ramp toward the service position until the predetermined pressure differential is achieved.

29. The service valve portion according to claim 27, wherein the first angle is between approximately 10° and 30°.

30. The service valve portion according to claim 27, wherein the first angle is between approximately 15° and 25°.

31. The service valve portion according to claim 27, wherein the first angle is approximately 20°.

32. The service valve portion according to claim 27, wherein the second angle is between approximately 20° and 40°.

33. The service valve portion according to claim 27, wherein the second angle is between approximately 25° and 35°.

34. The service valve portion according to claim 27, wherein the second angle is approximately 30°.

35. The service valve portion according to claim 23, wherein the main piston assembly includes a wing spring connected to the service slide valve and the second ramp is configured to engage a top end of the wing spring.

36. The service valve portion according to claim 23, wherein the second ramp includes the leading surface extending at a third angle with respect to the internal surface of the cylindrical sidewall, a base surface extending parallel to the cylindrical sidewall, and the trailing surface extending at a fourth angle with respect to a radial axis perpendicular to the internal surface of the cylindrical sidewall.

37. The service valve portion according to claim 35, wherein the second ramp includes the leading surface extending at a third angle with respect to the internal surface of the cylindrical sidewall, a base surface extending parallel to the cylindrical sidewall, and the trailing surface extending at a fourth angle with respect to a radial axis perpendicular to the internal surface of the cylindrical sidewall, and
 wherein the third angle of the leading surface of the second ramp is configured to allow the wing spring to move out of the second ramp as the service slide valve moves toward the release position and the fourth angle of the trailing surface of the second ramp is configured to prevent movement of the wing spring out of the second ramp and out of the service position until the predetermined pressure differential is achieved.

38. The service valve portion according to claim 36, wherein the third angle is between approximately 10° and 30°.

39. The service valve portion according to claim 36, wherein the third angle is between approximately 15° and 25°.

40. The service valve portion according to claim 36, wherein the third angle is approximately 20°.

41. The service valve portion according to claim 36, wherein the fourth angle is between approximately 20° and 40°.

42. The service valve portion according to claim 36, wherein the fourth angle is between approximately 25° and 35°.

43. The service valve portion according to claim 36, wherein the fourth angle is approximately 30°.

* * * * *